United States Patent
Frank

(10) Patent No.: US 12,362,786 B2
(45) Date of Patent: Jul. 15, 2025

(54) CALCULATING AN EVM OF AN ANTENNA PORT

(71) Applicant: Lenovo (Singapore) Pte. Ltd., New Tech Park (SG)

(72) Inventor: Colin D. Frank, Park Ridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/020,239

(22) PCT Filed: Aug. 9, 2021

(86) PCT No.: PCT/IB2021/057343
§ 371 (c)(1),
(2) Date: Feb. 7, 2023

(87) PCT Pub. No.: WO2022/029746
PCT Pub. Date: Feb. 10, 2022

(65) Prior Publication Data
US 2023/0291618 A1    Sep. 14, 2023

Related U.S. Application Data

(60) Provisional application No. 63/063,163, filed on Aug. 7, 2020, provisional application No. 63/063,179, filed on Aug. 7, 2020.

(51) Int. Cl.
*H04B 7/0413* (2017.01)
*H04B 7/005* (2006.01)
(Continued)

(52) U.S. Cl.
CPC .......... *H04B 7/0413* (2013.01); *H04B 7/005* (2013.01); *H04L 1/06* (2013.01);
(Continued)

(58) Field of Classification Search
CPC .................................................... H04B 7/0413
(Continued)

(56) References Cited

U.S. PATENT DOCUMENTS

2003/0035491 A1    2/2003  Walton et al.
2009/0196224 A1*   8/2009  Zhang ............... H04B 7/0665
                                                             370/328
(Continued)

OTHER PUBLICATIONS

PCT/IB2021/057339, "Notification of Transmittal of the International Search Report and the Written Opinion of the International Searching Authority, or the Declaration", International Searching Authority, Nov. 30, 2021, pp. 1-13.
(Continued)

*Primary Examiner* — Lihong Yu
(74) *Attorney, Agent, or Firm* — Kunzler Bean & Adamson

(57) ABSTRACT

Apparatuses, methods, and systems are disclosed for calculating an EVM of a transmitter. One apparatus includes a processor and a receiver that receives a signal via a propagation channel from an antenna port at a transmitter, the antenna port comprising multiple antennas and with an antenna connector for each antenna. The processor measures the received signal using an unbiased linear MMSE equalizer and calculates an EVM of the antenna port, where the EVM is calculated as 100 times the square root of the mean square error of the symbol estimate at the output of the unbiased linear MMSE equalizer.

17 Claims, 10 Drawing Sheets

(51) Int. Cl.
*H04L 1/06* (2006.01)
*H04L 25/03* (2006.01)
(52) U.S. Cl.
CPC .................. *H04L 25/03057* (2013.01); *H04L 2025/03426* (2013.01); *H04L 2025/03636* (2013.01)
(58) Field of Classification Search
USPC ........................................................ 375/232
See application file for complete search history.

(56) References Cited

U.S. PATENT DOCUMENTS

| | | | |
|---|---|---|---|
| 2013/0058427 | A1 | 3/2013 | Bai et al. |
| 2013/0238262 | A1* | 9/2013 | Asami ................. H04L 27/2647 702/58 |
| 2016/0352362 | A1* | 12/2016 | Fonseka ............. H03M 13/1102 |
| 2017/0214429 | A1* | 7/2017 | Eistein ................. H04L 1/0048 |
| 2018/0375597 | A1* | 12/2018 | Sur ...................... H04B 7/0452 |
| 2023/0171797 | A1 | 6/2023 | Bao et al. |
| 2023/0275626 | A1 | 8/2023 | Frank |

OTHER PUBLICATIONS

PCT/IB2021/057343, "Notification of Transmittal of the International Search Report and the Written Opinion of the International Searching Authority, or the Declaration", International Searching Authority, Dec. 2, 2021, pp. 1-13.
Qualcomm Inc., "TX EVM test condition correction for ULMIMO", 3GPP TSG-RAN WG4 Meeting #93 R4-1913226, Nov. 18-22, 2019, pp. 1-3.
Qualcomm Inc., "FR1 TX EVM test condition correction for ULMIMO", 3GPP TSG-RAN WG4 Meeting #94-e R4-2000204, Feb. 24-Mar. 6, 2020, pp. 1-4.
Huawei et al., "On UL MIMO Tx EVM requirement", 3GPP TSG-RAN WG4 Meeting #94-e-Bis R4-2004734, Apr. 20-30, 2020, pp. 1-2.
Motorola Mobility, "EVM Definitions for Antenna Ports and MIMO Layers", 3GPPRAN4#94-e-Bis R4-2004791, Apr. 20-30, 2020, pp. 1-5.
Qualcomm Inc., "FR1 TX EVM test condition correction for ULMIMO", 3GPP TSG-RAN WG4 Meeting #94-e-Bis R4-2004866, Apr. 20-30, 2020, pp. 1-3.
Qualcomm Inc., "CR to 38.101-1: Revision to ULMIMO EVM spec", 3GPP TSG RAN WG4 #95-e R4-2006777, May 25-Jun. 5, 2020, pp. 1-2.
Motorola Mobility, "On the Transmit EVM Requirement for UL MIMO Transmission", 3GPP TSG-RAN WG4 Meeting RAN4#95-e R4-2008057, May 25-Jun. 5, 2020, pp. 1-4.
Huawei et al., "On UL MIMO Tx EVM requirement", 3GPP TSG-RAN WG4 Meeting #95-e R4-2008214, May 25-Jun. 5, 2020, pp. 1-2.
Motorola Mobility, "Considerations on the EVM Definition for an Antenna Port or a Single MIMO Layer", 3GPP TSG-RAN WG4 Meeting RAN4#95-e R4-2008276, May 25-Jun. 5, 2020, pp. 1-5.
Motorola Mobility, "WF on EVM Requirement for UL MIMO Transmission", 3GPP TSG-RAN WG4 Meeting RAN4#95-e R4-2008404, May 25-Jun. 5, 2020, pp. 1-4.
Qualcomm, "WF on Enabling Transparent TxD in Rel-16", 3GPP TSG-RAN WG4 Meeting #95-e R4-2008465, May 25-Jun. 5, 2020, pp. 1-9.
Lenovo et al., "Further Considerations on the EVM Definition for Antenna Ports Including Transparent Transmit Diversity", 3GPP TSG-RAN WG4 Meeting RAN4#96-e R4-2011519, Aug. 17-28, 2020, pp. 1-9.
Lenovo et al., "On the Transmit EVM Requirement for UL MIMO Transmission", 3GPP TSG-RAN WG4 Meeting RAN4#96-e R4-2011520, Aug. 17-28, 2020, pp. 1-9.
3GPP, "3rd Generation Partnership Project; Technical Specification Group Radio Access Network; NR; User Equipment (UE) conformance specification; Radio transmission and reception; Part 1: Range 1 Standalone; (Release 16)", 3GPP TS 38.521-1 V16.4.0, Jun. 2020, pp. 1-275.
3GPP, "3rd Generation Partnership Project; Technical Specification Group Radio Access Network; NR; User Equipment (UE) conformance specification; Radio transmission and reception; Part 1: Range 1 Standalone; (Release 16)", 3GPP TS 38.521-1 V16.4.0, Jun. 2020, pp. 276-500.
U.S. Appl. No. 18/020,231 "Office Action Summary", USPTO, Jun. 20, 2024, pp. 1-12.
U.S. Appl. No. 18/020,231 "Office Action Summary", USPTO, Jan. 13, 2025, pp. 1-17.

\* cited by examiner

CALCULATING AN EVM OF AN ANTENNA PORT

CROSS-REFERENCE TO RELATED APPLICATIONS

This application claims priority to U.S. Provisional Patent Application No. 63/063,163 entitled "TRANSMITTER EVM DEFINITION FOR AN ANTENNA PORT" and filed on Aug. 5, 2020 for Colin D. Frank, which application is incorporated herein by reference. This application also claims priority to U.S. Provisional Patent Application No. 63/063,179 entitled "TRANSMITTER EVM DEFINITION FOR MULTI-LAYER TRANSMISSION" and filed on Aug. 5, 2020 for Colin D. Frank, which application is incorporated herein by reference.

FIELD

The subject matter disclosed herein relates generally to wireless communications and more particularly relates to configurations for transmitter Error Vector Magnitude ("EVM") definition for an antenna port.

BACKGROUND

In wireless communication devices, phase and amplitude distortion created by the power amplifier directly affects the quality of the communication. The most significant measurement for analyzing power amplifier performance in the latest communication system protocols is Error Vector Magnitude ("EVM"). This is a measure of modulation accuracy, or how well the power amplifier is transmitting information, represented by the varying phase and amplitude of an RF signal. EVM measurements lend insight into the communication link and are the key measure of transmitter performance.

However, due to leakage between the antennas within the UE, it seems that it is not possible to measure the EVM for the antenna connectors independently. If the EVM is measured without addressing the leakage between the two antennas, the EVM requirement cannot be met.

BRIEF SUMMARY

Disclosed are procedures for calculating an EVM of a transmitter. Said procedures may be implemented by apparatus, systems, methods, or computer program products.

One method for calculating an EVM of a transmitter includes generating a transmission signal and transmitting the generated transmission signal via a propagation channel using an antenna port at a transmitter, where the antenna port comprises multiple antennas and with an antenna connector for each antenna. The first method includes receiving the transmitted signal using an unbiased linear MMSE equalizer and calculating an EVM of the antenna port, where the EVM is calculated as 100 times the square root of the mean square error of the symbol estimate at the output of the unbiased linear MMSE equalizer.

Another method for calculating an EVM of a transmitter includes generating a single-layer MIMO signal and transmitting the single-layer MIMO signal via a propagation channel using a transmitter. The second method includes receiving the transmitted single-layer MIMO signal using an unbiased linear MMSE receiver and calculating an EVM of the transmitter, where the EVM for the transmitted single-layer MIMO signal is calculated as 100 times the square root of the mean square error of the symbol estimate at the output of the unbiased linear MMSE receiver.

One method of a receiver/evaluator for calculating an EVM of a transmitter includes receiving a signal via a propagation channel from an antenna port at a transmitter, where the antenna port comprises multiple antennas and with an antenna connector for each antenna. The method includes measuring the received signal using an unbiased linear MMSE equalizer and calculating an EVM of the antenna port, where the EVM is calculated as 100 times the square root of the mean square error of the symbol estimate at the output of the unbiased linear MMSE equalizer.

Another method of a receiver/evaluator for calculating an EVM of a transmitter includes receiving the single-layer MIMO signal from a transmitter via a propagation channel and measuring the received single-layer MIMO signal using an unbiased linear MMSE receiver. The method includes calculating an EVM of the transmitter, wherein the EVM for the received single-layer MIMO signal is calculated as 100 times the square root of the mean square error of the symbol estimate at the output of the unbiased linear MMSE receiver.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
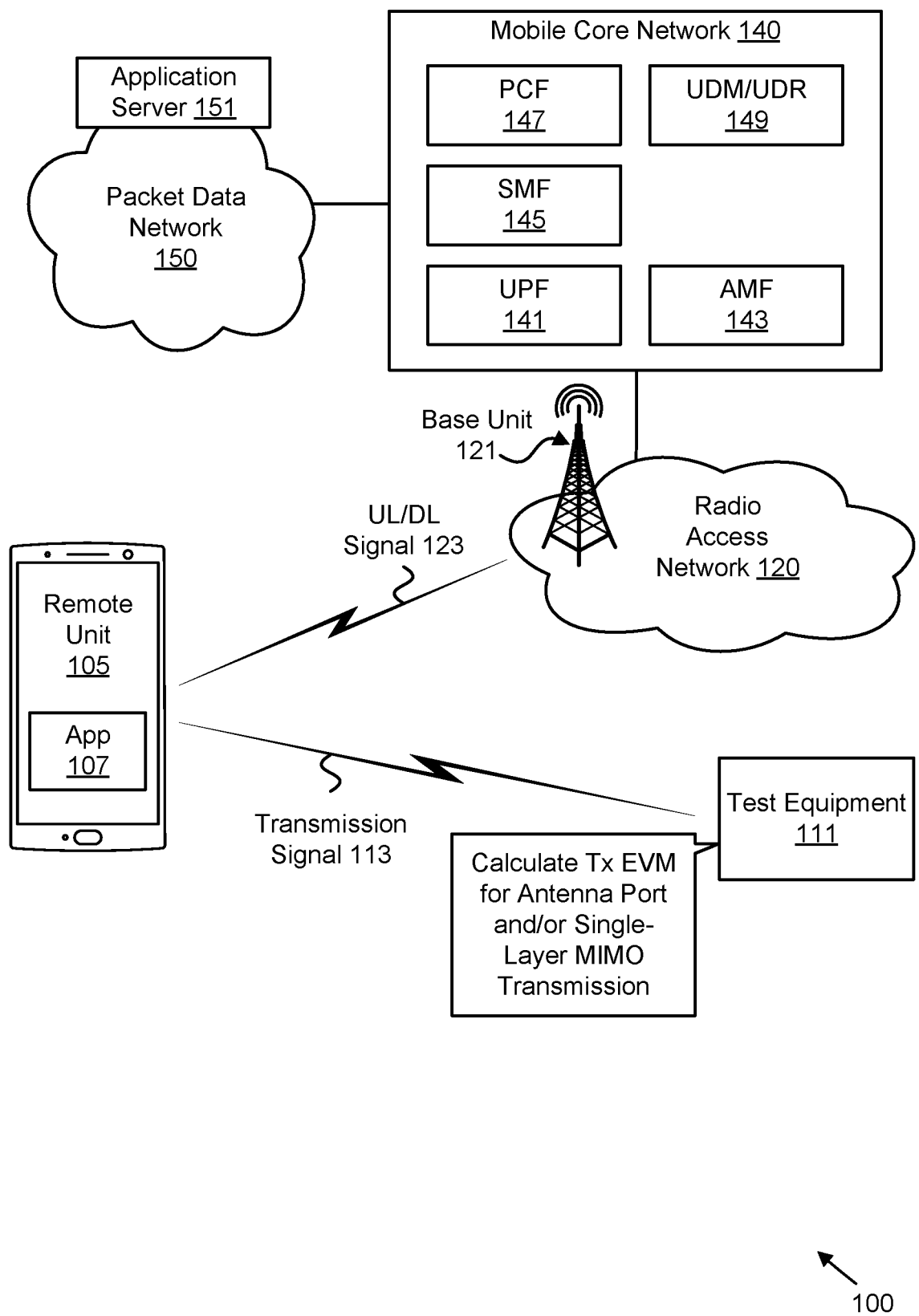
FIG. 1 is a schematic block diagram illustrating one embodiment of a wireless communication system for calculating an EVM of a transmitter.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for mechanisms for calculating an error vector magnitude ("EVM") of a transmitter. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

The problem solved is the defining the transmitter EVM for an antenna port in which a single transmission layer is transmitted from multiple antennas and received on multiple antennas. The solutions also apply to transparent transmit diversity. Due to leakage between the antennas within the UE, it seems that it is not possible to measure the EVM for the antenna connectors independently. If the EVM is measured without addressing the leakage between the two antennas, the EVM requirement cannot be met.

There is currently no agreement in 3GPP on how requirements on how transmitter EVM should be specified for an antenna port comprised of multiple antennas and transmitting a single layer.

The purpose of the EVM requirement on the transmitter is to limit the noise floor at the receiver that is due to transmitter noise. Presumably, for multi-layer MIMO transmissions, the objective of the EVM requirement is to define EVM for an antenna port in a way that it directly maps to the error floor at the receiver. Because the purpose of the EVM requirement is to set a lower bound on the link performance due to transmitter impairments, the relationship between the per antenna connector EVM at the UE antenna connectors and the per-layer EVM at the gNB should be understood.

The present disclosure describes using a linear unbiased MMSE equalizer (also referred to herein as a linear unbiased MMSE receiver). The present disclosure also shows that the resulting EVM is achievable by the UE independent of the propagation channel between the UE and the gNB (i.e., 5G base station).

Described herein is the relationship between the EVM at the transmitter antenna connectors and the antenna port EVM at the receiver for the case where the number of transmit and receive antennas are the same. Based on this analysis, solutions are described on how the EVM can be defined and specified at the transmitter for antenna port and single-layer MIMO transmission.

While previous solutions use test equipment to measure the EVM by implementing a linear receiver—the linear minimum norm unbiased receiver or the normalized max-ratio combining receiver—and measure the mean-square error at the output of the receiver. The drawback of these approaches is that the error is a function of the channel between the transmitter and receiver whereas the transmitter EVM should be a function of the transmitter only.

In some embodiments, a transmitting device generates a transmission signal and transmits the generated transmission signal via a propagation channel using an antenna port at a transmitter, the antenna port comprising multiple antennas and with an antenna connector for each antenna. The evaluation device receives the transmitted signal using an unbiased linear MMSE equalizer and calculates an EVM of the antenna port, where the EVM is calculated as 100 times the square root of the mean square error of the symbol estimate at the output of the unbiased linear MMSE equalizer. While the below examples and descriptions may use a UE transmitter when describing the transmitting device, in other examples the transmitting device may be a gNB or other base station; thus, the transmitter EVM determined according to the below descriptions may be a UE transmitter EVM, a gNB transmitter EVM, or transmitter EVM of another transmitter.

In other embodiments, the transmitting device generates a single-layer MIMO signal and transmits the single-layer MIMO signal via a propagation channel using a transmitter. The evaluation device receives the transmitted single-layer MIMO signal using an unbiased linear MMSE equalizer and calculates an EVM of the transmitter (e.g., UE transmitter or gNB transmitter), where the EVM for the transmitted single-layer MIMO signal is calculated as 100 times the square root of the mean square error of the symbol estimate at the output of the unbiased linear MMSE equalizer.

The present disclosure describes an expression for the EVM for an antenna port that is independent of the channel between the transmitter (e.g., UE transmitter or gNB transmitter) and the receiver so long as the channel is invertible. The expression assumes that the number of receive antennas is equal to the number of transmit antennas and that the receiver uses an unbiased linear MMSE receiver. The expression is simple and only depends on the signal mean and the noise covariance at the antenna connectors. Furthermore, if the noise at the antenna connectors is uncorrelated, the port EVM can be simply calculated in terms of the EVM values for the individual antenna connectors. The solutions apply to an antenna port comprised of any number of antennas, so long as the number or receive antennas is equal to the number of transmit antennas.

As a first solution for defining transmitter EVM for an antenna port, if the transmitter noise n at the two antenna connectors is observed to be independent so that the observed covariance matrix $\Sigma = \langle n^H n \rangle$ is diagonal, then the port EVM is given as $$EVM_{port} = \sqrt{\frac{EVM_1^2 EVM_2^2}{EVM_1^2 + EVM_2^2}}$$

where $EVM_1$ and $EVM_2$ are the EVM values for the first and second antenna connectors.

As a second solution for defining transmitter EVM for an antenna port, if the transmitter noise is correlated so that $\Sigma$ is not diagonal, then the EVM for the port or layer can be computed either as $$EVM_{port} = 100 \cdot \sqrt{(w^H \Sigma^{-1} w)^{-1}}$$

or equivalently as $$EVM_{port} = 100 \cdot \left( [1 \ 1]^H \sum{}'^{-1} \begin{bmatrix} 1 \\ 1 \end{bmatrix} \right)^{-\frac{1}{2}}$$

where w is a 2×1 vector given by $$w = \begin{bmatrix} w_1 \\ w_2 \end{bmatrix} = \begin{bmatrix} g_1 & w_1' \\ g_2 & w_2' \end{bmatrix},$$

w' is the 2×1 rank 1 precoder applied at baseband, $g_1$ and $g_2$ are the complex gains of the transmitter front ends for the first and second antennas, and $$\Sigma' = \langle n'^H n' \rangle.$$

FIG. 1 depicts a wireless communication system 100 for calculating an EVM of a transmitter, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G")

system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for calculating an EVM of a transmitter apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems calculating an EVM of a transmitter (e.g., UE transmitter or gNB transmitter).

As described above, EVM is a measure of modulation accuracy, or how well the power amplifier in the remote unit 105 is transmitting information, represented by the varying phase and amplitude of an RF signal. As such, the remote unit 105 may send a transmission signal 113 (e.g., a single-layer MIMO transmission) to a test equipment 111. Upon receiving the transmission signal 113, the test equipment 111 calculates a transmitter EVM for antenna port and/or single-layer MIMO transmission. Note that in other embodiments, the remote unit 105 may transmit to the base unit 121, where the base unit 121 calculates a transmitter EVM for antenna port and/or single-layer MIMO transmission.

For single antenna transmission and reception, the EVM at the transmit antenna connector and the EVM at the output of the single antenna receiver are the same since the receiver can simply invert the channel. However, the relationship between the EVM at the remote unit 105 antenna connectors and the noise floor at the receiver is not clear for an antenna port comprised of multiple transmit antennas.

The present disclosure evaluates the relationship between the noise at the (e.g., UE) transmitter antenna connectors and the resulting noise floor at the receiver/evaluator (e.g., gNB) for an unbiased MMSE receiver. Based on this relationship, the disclosure describes an EVM definition for antenna ports when the number of receive antennas is assumed to be equal to the number of transmit antennas.

Figure 2:
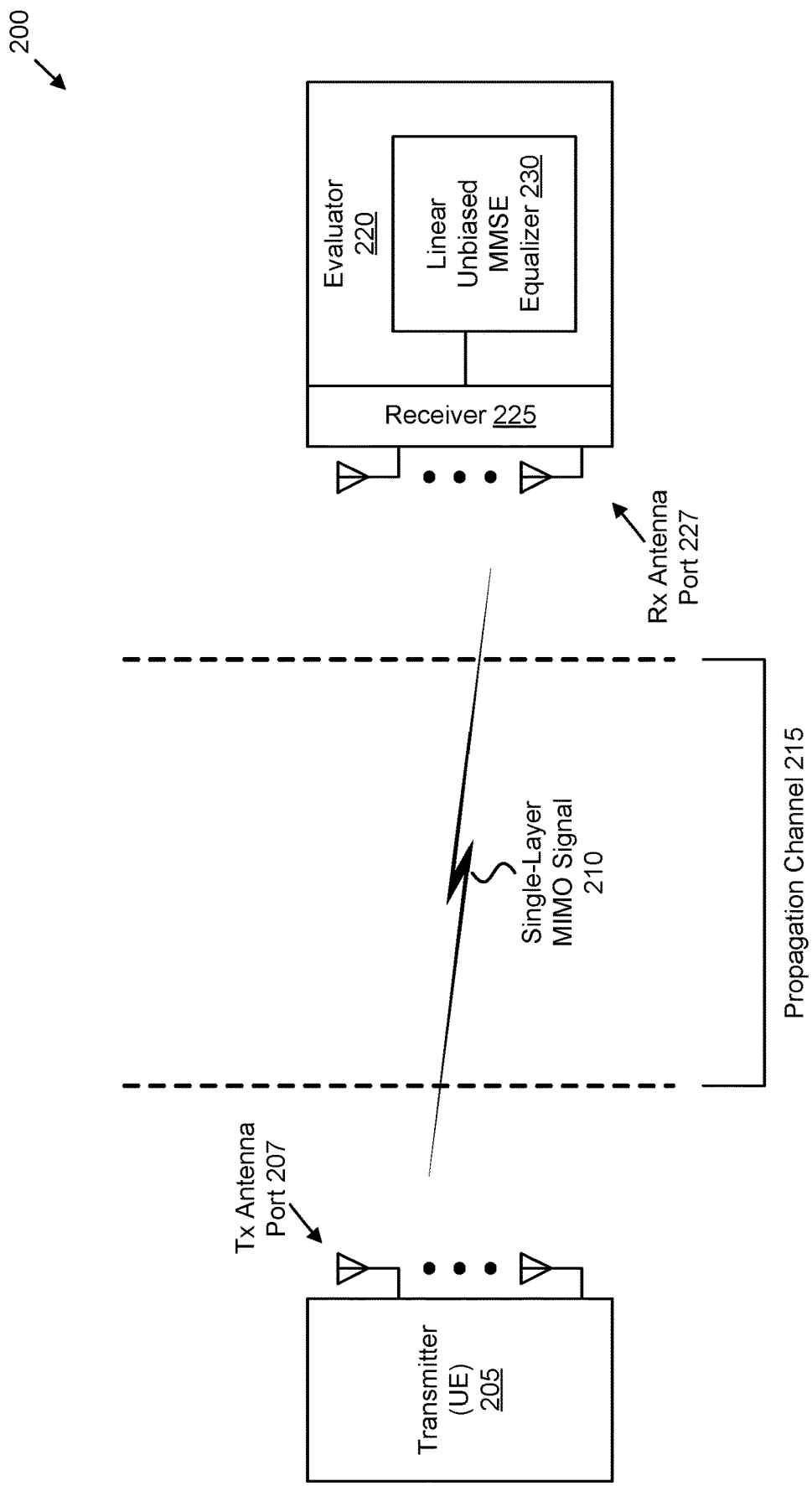
FIG. 2 is a block diagram illustrating one embodiment of a communication arrangement for calculating an EVM of a transmitter.

FIG. 2 is a block diagram illustrating one embodiment of a communication arrangement 200 for calculating a transmitter EVM of an antenna port and/or single-layer MIMO transmission. The arrangement 200 involves a transmitter 205 and an evaluator 220 for calculating an EVM of the transmitter 205. As depicted, the transmitter comprises a plurality of antennas. In some embodiments, the plurality of transmitter antennas ("Tx antennas") are arranged into one or more antenna ports 207 (i.e., Tx antenna ports), each antenna port 207 comprising multiple antennas and with an antenna connector for each antenna. In certain embodiments, the transmitter 205 is one embodiment of the remote unit 105 and the evaluator 220 is an embodiment of the test equipment 111 or the base unit 121. However, in other embodiments the transmitter may be an embodiment of the base unit 121, wherein the evaluator 220 is an embodiment of the test equipment 111 or another base unit 121.

The transmitter 205 generates a transmission signal, for example a single-layer MIMO signal and transmits the signal 210 to the evaluator 220 via a propagation channel 215. The evaluator 220 measures the signal 210 using an unbiased linear MMSE equalizer 230 and calculates an EVM of the transmitter antenna port, according to the below descriptions. Note that the receiver 225 of the evaluator 220 may comprise a plurality of antennas. In some embodiments, the plurality of receiver antennas ("Rx antennas") are arranged into one or more antenna ports 227 (i.e., Rx antenna ports), each antenna port 227 comprising multiple antennas and with an antenna connector for each antenna. Importantly, the transmission signal 210 is received by the receiver 225 using the same number of antennas as used by the transmitter 205. For example, the Rx antenna port 227 may comprise the same number of antennas as comprises the Tx antenna port 207.

Figure 3:
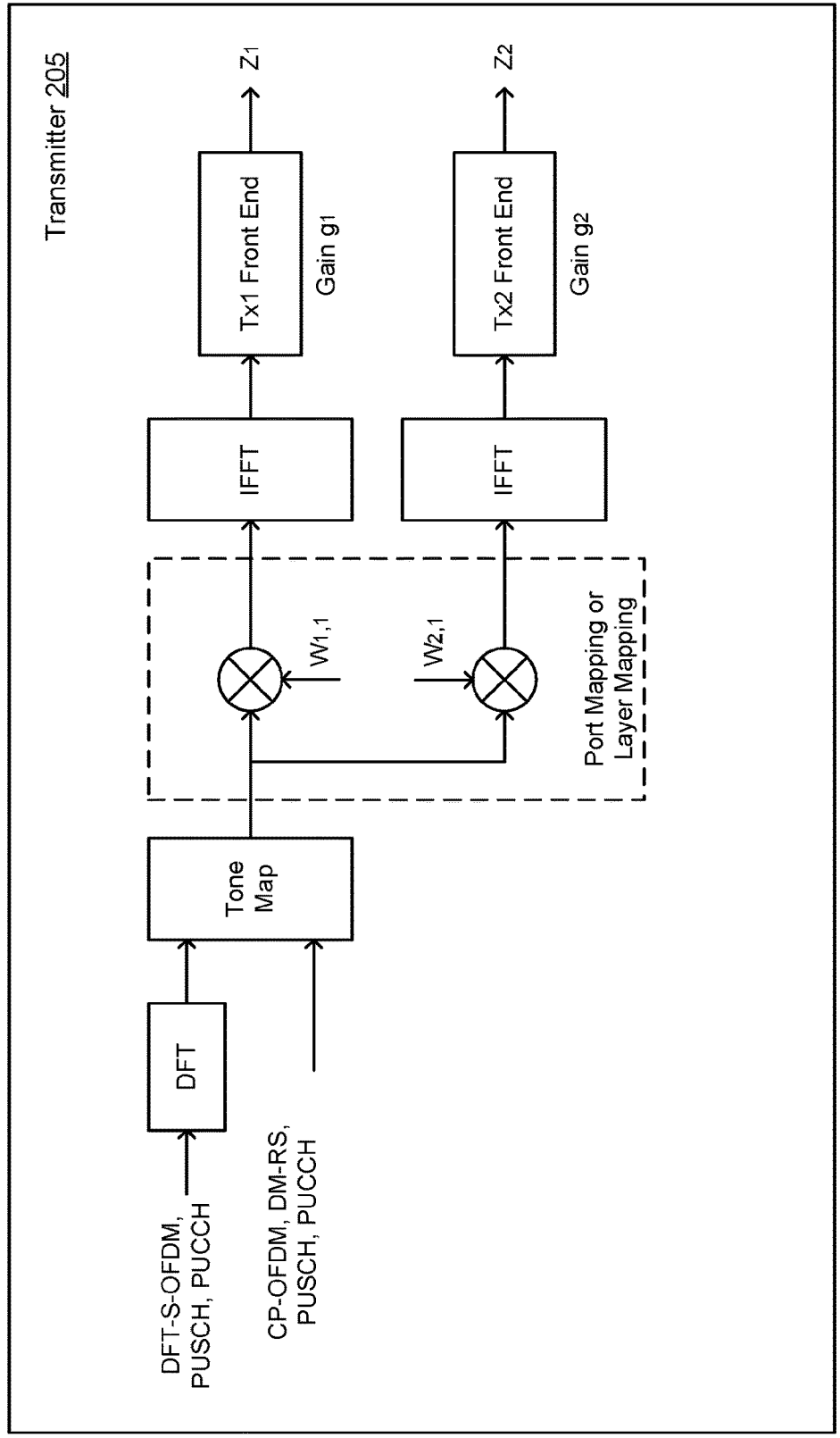
FIG. 3 is a block diagram illustrating one embodiment of a transmitter for antenna port or single-layer MIMO transmission corresponding to two physical antennas.

FIG. 3 depicts one example of a UE implementation 300 of a transmitter 205 for antenna port corresponding to two physical antennas, according to embodiments of the disclosure. With this implementation, the same complex-valued antenna weights can be applied to all subcarriers, or alternatively, different complex-valued antenna weights can be applied to each subcarrier or to each resource block ("RB"). In the case of small-delay cyclic diversity, the phase of the complex weight on the second antenna varies linearly with frequency.

In this contribution, we only consider the case in which the number of (e.g., gNB) receive antennas is equal to the number of (e.g., UE) antennas used to transmit (with non-zero power) the signal corresponding to the antenna port. For a single-layer transmission, the frequency-domain signal at the transmitter antenna connectors is given by $$z = wx + n,$$

where x is the data symbol, n is the transmitter noise at the two antenna connectors given by given by $n = [n_1 \ n_2]^T$. Here w is a 2×1 vector given by $$\begin{bmatrix} w_1 \\ w_2 \end{bmatrix} = \begin{bmatrix} g_1 & w'_1 \\ g_2 & w'_2 \end{bmatrix}$$

where w' is the 2×1 rank 1 precoder applied at baseband, and $g_1$ and $g_2$ are the complex gains of the transmitter front ends for the first and second antennas.

Figure 4:
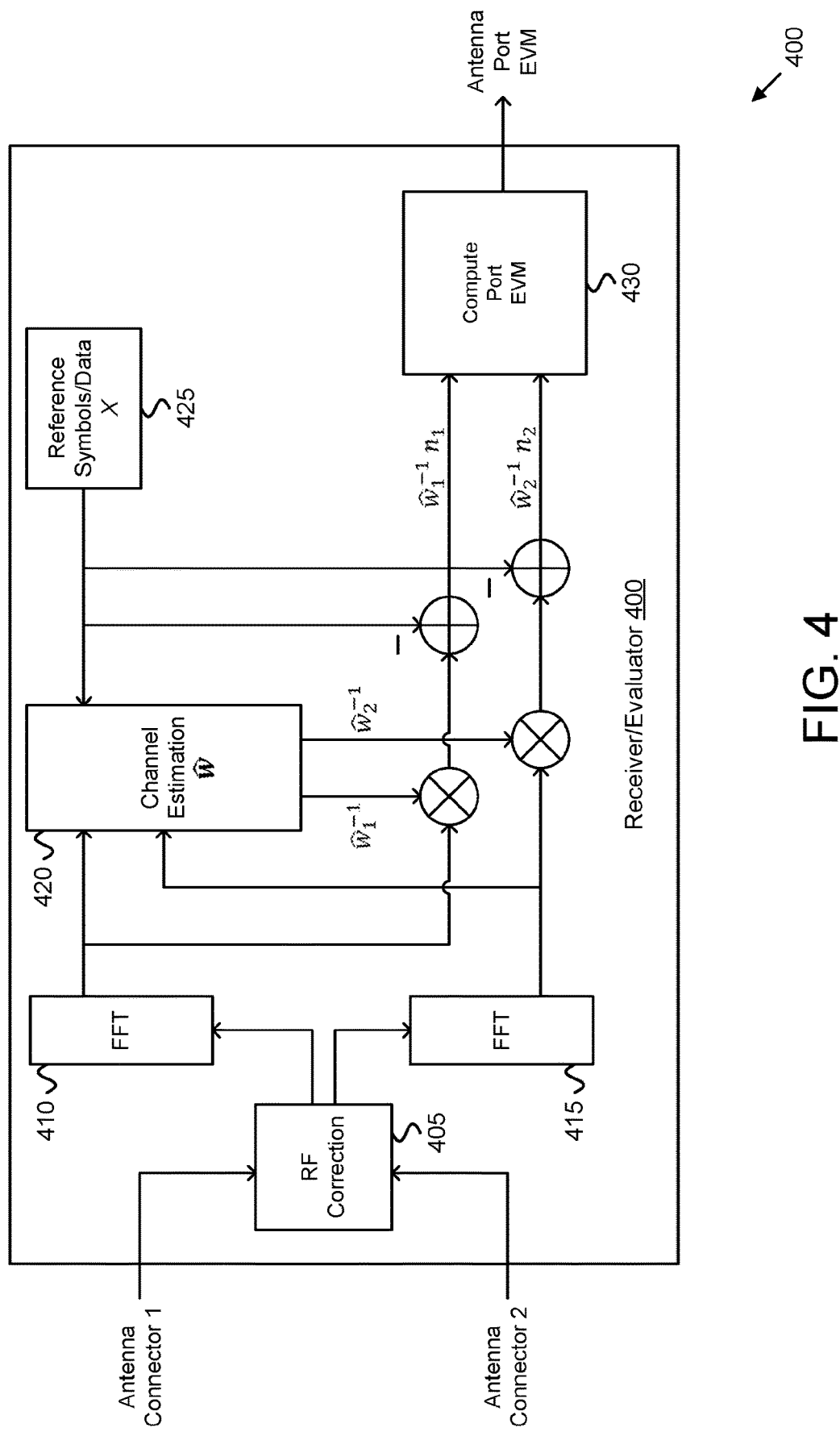
FIG. 4 is a block diagram illustrating one embodiment of a receiver used for EVM measurement.

FIG. 4 depicts a high-level block diagram of the MIMO receiver and evaluator ("receiver/evaluator") 400 used for EVM measurement. The receiver/evaluator 400 may be implemented by a base unit 121, such as a gNB or other RAN node, or it may be implemented by test equipment 111. The receiver/evaluator 400 is coupled to two antennas, with an antenna connector for each antenna (antenna connector #1 and antenna connector #2). Here, the receiver/evaluator 400 receives a transmission signal (e.g., a single-layer MIMO transmission), such as that generated and transmitted by the transmitter 205, using an antenna port that comprises the two antennas (and antenna connectors #1 and #2).

In the depicted embodiment, the receiver/evaluator 400 may include a common RF correction block 405. In other embodiments, the receiver/evaluator 400 may use separate RF correction blocks for each antenna, e.g., a first RF correction block for a first antenna connector and a second RF correction block for a second antenna connector.

A first Fast Fourier Transform ("FFT") block 410 receives the output of the RF correction block 405, while a second FFT block 415 receives the output of the RF correction block 405. Both FFT blocks send their output to the channel estimation block 420. The channel estimation block 420 also receives reference symbols and/or known data from the block 425. The FFT block outputs are further mixed with the output from the channel estimation block to estimate the data symbols of the transmission signal. Using the reference symbols, the error of the symbol estimate is obtained. The equalizer block 430 computes the antenna port EVM, as described below.

Fundamentally, the EVM that will be observed at the receiver (without self-noise) depends on the number of receive antennas at the receiver and the type of receiver that is used. Note that the single antenna receiver will not be considered further here because it is not possible to define EVM for the UE transmitter in a way that limits the noise floor at the output of the single antenna gNB receiver. The reason for this is that the signals transmitted from the two antennas can cancel in the channel while the transmitter noise received from the two antennas will add in power if uncorrelated.

For the case of two receive antennas, the frequency-domain signal received by the gNB is given by $$y = H(wx+n),$$

where H is the 2×2 channel matrix between the transmitter (e.g., UE or gNB) and the receiver (e.g., test equipment or gNB). Regarding, the noise variance at the output of a linear unbiased MMSE receiver, in general, the MMSE receiver is biased in that the expected value of the output is not equal to the true value. However, in order to correctly measure the EVM, the estimate of the received symbol must be unbiased so that the expected value of $\hat{x}$ is equal to x.

The linear MMSE receiver is given as the product of the matrix $A_{MMSE}$ and the received vector y $$\hat{x}_{MMSE} = A_{MMSE} y$$

where it can be shown the matrix $A_{MMSE}$ is given by $$A_{MMSE} = w^H H^H (Hww^H H^H + H\Sigma H^H)^{-1}.$$

and $\Sigma = E(n^H n)$. The expected value of the MMSE estimate $\hat{x}$ is then given by $$E[\hat{x}_{MMSE} \mid x] = E\left[w^H H^H \left(Hww^H H^H + H\sum H^H\right)^{-1} H(wx+n) \mid x\right],$$
$$= w^H H^H \left(Hww^H H^H + H\sum H^H\right)^{-1} Hwx$$

where it has been assumed that the matrix H is invertible. In the case that $$w^H H^H (Hww^H H^H + H\Sigma H^H)^{-1} Hw \neq 1,$$

the MMSE estimator is biased and $$E[\hat{x}_{MMSE} \mid x] \neq x.$$

The unbiased MMSE estimate is given by normalizing the MMSE estimator by the mean so that $$\hat{x}_{MMSE,U} = A_{MMSE,U} y$$

where $$A_{MMSE,U} = \frac{w^H H^H \left(Hww^H H^H + H\sum H^H\right)^{-1}}{w^H H^H \left(Hww^H H^H + H\sum H^H\right)^{-1} Hw}$$

Expanding, we have $$\hat{x}_{MMSE,U} = \frac{w^H H^H \left(Hww^H H^H + H\sum H^H\right)^{-1}}{w^H H^H \left(Hww^H H^H + H\sum H^H\right)^{-1} Hw} H(wx+n)$$

so that $$E[\hat{x}_{MMSE,U} \mid x] = \frac{w^H H^H \left(Hww^H H^H + H\sum H^H\right)^{-1} Hw}{w^H H^H \left(Hww^H H^H + H\sum H^H\right)^{-1} Hw} x = x,$$

and the noise at the output of the receiver is given by $$v_{MMSE,U} = \frac{w^H H^H \left(Hww^H H^H + H\sum H^H\right)^{-1} H}{w^H H^H \left(Hww^H H^H + H\sum H^H\right)^{-1} Hw} n.$$

The variance of the noise is given by $$E(|v_{MMSE,U}|^2) = \frac{H\sum H^H \left(Hww^H H^H + H\sum H^H\right)^{-1} H^H w}{\left(w^H H^H \left(Hww^H H^H + H\sum H^H\right)^{-1} Hw\right)^2}$$

The corresponding port EVM at the output of the linear unbiased MMSE receiver is then given by $$EVM_{port} = \sqrt{E(|v_{MMSE,U}|^2)}.$$

An important issue to consider is whether the linear unbiased MMSE receiver can be implemented by the gNB for an antenna port given the gNB cannot measure the channel H because there are no per-antenna reference symbols. However, in examining the linear unbiased MMSE receiver $$A_{MMSE,U} = \frac{w^H H^H \left(Hww^H H^H + H\sum H^H\right)^{-1}}{w^H H^H \left(Hww^H H^H + H\sum H^H\right)^{-1} Hw}$$

it is apparent that the receiver only needs to measure and estimate two quantities, and these are the composite channel H w and the covariance of the received transmitter noise before equalization $H\Sigma H^H$. Now the vector H w can be measured using the port-based reference symbols. Using the channel estimate and the same reference symbols, the noise H n can be estimated as $$\widehat{Hn} = y - \widehat{Hw}x$$

and from this, $H\Sigma H^H$ can be estimated as $$E(\widehat{Hn}(\widehat{Hn})^H).$$

Since both quantities H w and $H\Sigma H^H$ can be estimated at the gNB receiver, the unbiased linear MMSE receiver is implementable for an antenna port.

The proposed port EVM definition given above is $$EVM_{port} = \sqrt{E(|v_{MMSE,U}|^2)}.$$

where $$E(|v_{MMSE,U}|^2) = \frac{w^H H^H \left(Hww^H H^H + H\sum H^H\right)^{-1} H\sum H^H \left(Hww^H H^H + H\sum H^H\right)^{-1} H^H w}{\left(w^H H^H \left(Hww^H H^H + H\sum H^H\right)^{-1} Hw\right)^2}.$$

However, if the propagation channel H between the UE is invertible, we have $$E(|v_{MMSE,U}|^2) = \frac{w^H \left(ww^H + \sum\right)^{-1} \sum \left(ww^H + \sum\right)^{-1} w}{\left(w^H \left(ww^H + \sum\right)^{-1} w\right)^2},$$

and the noise covariance is independent of the propagation channel Thus, the EVM at the gNB receiver due to the noise at the UE transmitter is independent of the propagation channel H so long as the channel H is invertible.

The noise variance at the output of the linear unbiased MMSE receiver is given by.

$$E(|v|^2) = \frac{w^H \left(ww^H + \sum\right)^{-1} \sum \left(ww^H + \sum\right)^{-1} w}{\left(w^H \left(ww^H + \sum\right)^{-1} w\right)^2}$$

Using the Sherman-Morrison Formula given by $$\left(ww^H + \sum\right)^{-1} = \sum^{-1} - \frac{\sum^{-1} ww^H \sum^{-1}}{1 + w^H \sum^{-1} w}$$

the denominator of the variance can be simplified as $$\left(w^H \left(ww^H + \sum\right)^{-1} w\right)^2 = \left(w^H \left(\sum^{-1} - \frac{\sum^{-1} ww^H \sum^{-1}}{1 + w^H \sum^{-1} w}\right) w\right)^2 =$$

$$\left(w^H \sum^{-1} w - \frac{w^H \sum^{-1} ww^H \sum^{-1} w}{1 + w^H \sum^{-1} w}\right)^2 =$$

-continued $$\left(w^H \sum^{-1} w \left(1 - \frac{w^H \sum^{-1} w}{1 + w^H \sum^{-1} w}\right)\right)^2 = \left(\frac{w^H \sum^{-1} w}{1 + w^H \sum^{-1} w}\right)^2.$$

Again, using the Sherman-Morrison Formula, the numerator can be simplified as $$w^H \left(ww^H + \sum\right)^{-1} \sum \left(ww^H + \sum\right)^{-1} w =$$

$$w^H \left(\sum^{-1} - \frac{\sum^{-1} ww^H \sum^{-1}}{1 + w^H \sum^{-1} w}\right) \sum \left(\sum^{-1} - \frac{\sum^{-1} ww^H \sum^{-1}}{1 + w^H \sum^{-1} w}\right) w =$$

$$w^H \left(I - \frac{\sum^{-1} ww^H}{1 + w^H \sum^{-1} w}\right) \left(\sum^{-1} - \frac{\sum^{-1} ww^H \sum^{-1}}{1 + w^H \sum^{-1} w}\right) w =$$

$$w^H \left(\sum^{-1} - \frac{\sum^{-1} ww^H \sum^{-1}}{1 + w^H \sum^{-1} w} - \right.$$

$$\left. \frac{\sum^{-1} ww^H \sum^{-1}}{1 + w^H \sum^{-1} w} + \frac{\sum^{-1} ww^H \sum^{-1} ww^H \sum^{-1}}{1 + w^H \sum^{-1} w}\right) w =$$

$$w^H \sum^{-1} w \left(1 - 2\frac{w^H \sum^{-1} w}{1 + w^H \sum^{-1} w} + \frac{\left(w^H \sum^{-1} w\right)^2}{1 + w^H \sum^{-1} w}\right) =$$

$$\frac{w^H \sum^{-1} w}{\left(1 + w^H \sum^{-1} w\right)^2}.$$

Combining these expressions for the numerator and the denominator, we have the variance of the noise at the output of the unbiased MMSE receiver is given by $$E(|v|^2) = \frac{w^H \left(ww^H + \sum\right)^{-1} \sum \left(ww^H + \sum\right)^{-1} w}{\left(w^H \left(ww^H + \sum\right)^{-1} w\right)^2} =$$

$$\frac{w^H \sum^{-1} w}{\left(1 + w^H \sum^{-1} w\right)^2} \left(\frac{1 + w^H \sum^{-1} w}{w^H \sum^{-1} w}\right)^2 = \left(w^H \sum^{-1} w\right)^{-1}.$$

it is shown that the variance of $v_{MMSE,U}$ can be further simplified as $$E(|v_{MMSE,U}|^2) = (w^H \Sigma^{-1} w)^{-1},$$

so that the corresponding port EVM is given by $$EVM_{port} = 100 \cdot \sqrt{(w^H \Sigma^{-1} w)^{-1}}.$$

To compute the Antenna Port EVM, for the case of transparent transmit diversity (or for antenna ports in general), neither w', the baseband precoder, nor w, the precoder modified by the transmitter impairment, is known to the test equipment. However, an estimate ŵ of w can be formed by correlating the output of the FFT's with either the known reference symbols or with the data x if the data is known to the test equipment. The outputs of the FFT's are then multiplied by the inverse of the estimate ŵ after which the scaled noise n' given by $$n' = \begin{bmatrix} n'_1 \\ n'_2 \end{bmatrix} = \begin{bmatrix} \hat{w}_1^{-1} & n_1 \\ \hat{w}_2^{-1} & n_2 \end{bmatrix}$$

is estimated by subtracting the reference symbols or the data symbol x, if known. The values $n'_1$ and $n'_2$ are the errors that are used to measure the per antenna connector EVM's.

Given estimates of n' and w, the EVM for the antenna port can be computed as $$\text{EVM}_{port} = 100 \cdot \sqrt{(w^H \Sigma^{-1} w)^{-1}}$$

where w has been estimated and $\Sigma$ can be computed as $$\Sigma = \langle n^H n \rangle$$

and $$n = \begin{bmatrix} w_1 & n'_1 \\ w_2 & n'_2 \end{bmatrix}.$$

Alternatively, the EVM can be calculated as $$\sqrt{(w^H \Sigma^{-1} w)^{-1}} = \left([w_1 \, w_2]^H \left(\left[\begin{matrix} n_1 \\ n_2 \end{matrix}\right]^H [n_1 \, n_2]\right)^{-1} \begin{bmatrix} w_1 \\ w_2 \end{bmatrix}\right)^{-\frac{1}{2}} =$$

$$\left([w_1 \, w_2]^H \left(\left[\begin{matrix} w_1 & n'_1 \\ w_2 & n'_2 \end{matrix}\right]^H [w_1 n'_1 \, w_2 n'_2]\right)^{-1} \begin{bmatrix} w_1 \\ w_2 \end{bmatrix}\right)^{-\frac{1}{2}} = \left([1 \, 1]^H \Sigma'^{-1} \begin{bmatrix} 1 \\ 1 \end{bmatrix}\right)^{-\frac{1}{2}}$$

where $$\Sigma' = \langle n'^H n' \rangle.$$

If the transmitter noise on the two antennas is uncorrelated, the EVM becomes $$EVM_{port} = 100 \cdot \left([1 \, 1]^H \Sigma'^{-1} \begin{bmatrix} 1 \\ 1 \end{bmatrix}\right)^{-\frac{1}{2}} =$$

$$\left(\frac{1}{\langle n_1'^2 \rangle} + \frac{1}{\langle n_2'^2 \rangle}\right)^{-\frac{1}{2}} = 100 \cdot \left(\left(\frac{100}{EVM_1}\right)^2 + \left(\frac{100}{EVM_2}\right)^2\right)^{-\frac{1}{2}} =$$

$$100 \cdot \left(100^2 \frac{EVM_1^2 + EVM_2^2}{EVM_1^2 EVM_2^2}\right)^{-\frac{1}{2}} = \sqrt{\frac{EVM_1^2 EVM_2^2}{EVM_1^2 + EVM_2^2}}.$$

It is interesting to consider the case in which $EVM_2$ is equal to $EVM_1$, as in this case, we have $$EVM_{port} = \frac{EVM_1}{\sqrt{2}},$$

which makes sense intuitively since the signals can be added in phase while the noise adds in power.

In this disclosure, the relationship between the transmitter impairments and noise and the EVM at the output of the receiver have been evaluated for the case that the number of (e.g., gNB) receive antennas is equal to the number of (e.g., UE) transmit antennas and with the assumption that a linear unbiased MMSE receiver is used by the receiver.

As a result of the above, the following solutions reflect the noise floor at the receiver resulting from the transmitter impairments in the case that the receiver has two receive antennas and implements the unbiased linear MMSE receiver.

As a first solution for defining transmitter EVM for an antenna port, if the transmitter noise n at the two antenna connectors is observed to be independent so that the observed covariance matrix $\Sigma = \langle n^H n \rangle$ is diagonal, then the port EVM is given as $$EVM_{port} = \sqrt{\frac{EVM_1^2 EVM_2^2}{EVM_1^2 + EVM_2^2}}$$

where $EVM_1$ and $EVM_2$ are the EVM values for the first and second antenna connectors.

As a second solution for defining transmitter EVM for an antenna port, if the transmitter noise is correlated so that $\Sigma$ is not diagonal, then the EVM for the port or layer can be computed either as $$\text{EVM}_{port} = 100 \cdot \sqrt{(w^H \Sigma^{-1} w)^{-1}}$$

or equivalently as $$EVM_{port} = 100 \cdot \left([1 \, 1]^H \Sigma'^{-1} \begin{bmatrix} 1 \\ 1 \end{bmatrix}\right)^{-\frac{1}{2}}$$

where w, $\Sigma$, and $\Sigma'$ are defined above.

Figure 5:
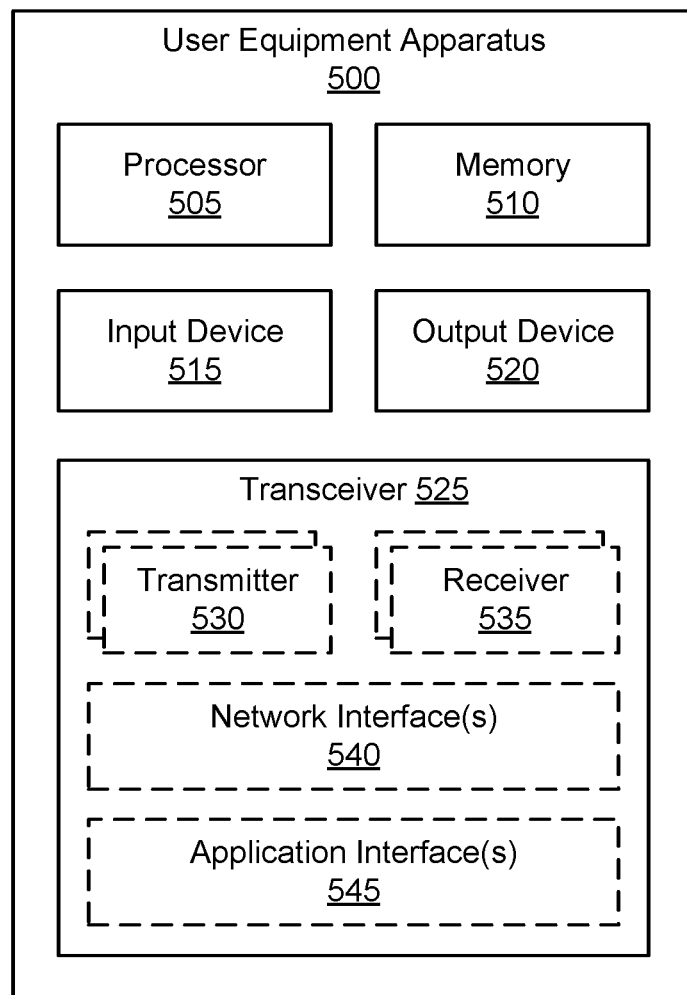
FIG. 5 is a block diagram illustrating one embodiment of a user equipment apparatus that may be used for determining transmitter EVM for an antenna port.

FIG. 5 depicts a user equipment apparatus 500 that may be used for calculating an EVM of a transmitter, according to embodiments of the disclosure. In various embodiments, the user equipment apparatus 500 is used to implement one or more of the solutions described above. The user equipment apparatus 500 may be one embodiment of the remote unit 105 and/or the transmitter 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 generates a transmission signal and controls the transceiver 525 to transmit the generated transmission signal to an evaluation device via a propagation channel using an antenna port at a transmitter, the antenna port comprising multiple antennas and with an antenna connector for each antenna. As described herein, the evaluation device measures the transmitted signal using an unbiased linear MMSE equalizer and calculates an EVM of the antenna port, wherein the EVM is calculated as 100 times the square root of the mean square error of the symbol estimate at the output of the unbiased linear MMSE equalizer.

In various embodiments, the processor 505 generates a single-layer MIMO signal and controls the transceiver 525 to transmit the generated single-layer MIMO signal to an evaluation device via a propagation channel using a transmitter. As described herein, the evaluation device measures the single-layer MIMO signal using an unbiased linear MMSE equalizer and calculates an EVM of the transmitter, wherein the EVM for the single-layer MIMO signal is calculated as 100 times the square root of the mean square error of the symbol estimate at the output of the unbiased linear MMSE equalizer.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to calculating an EVM of a transmitter. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
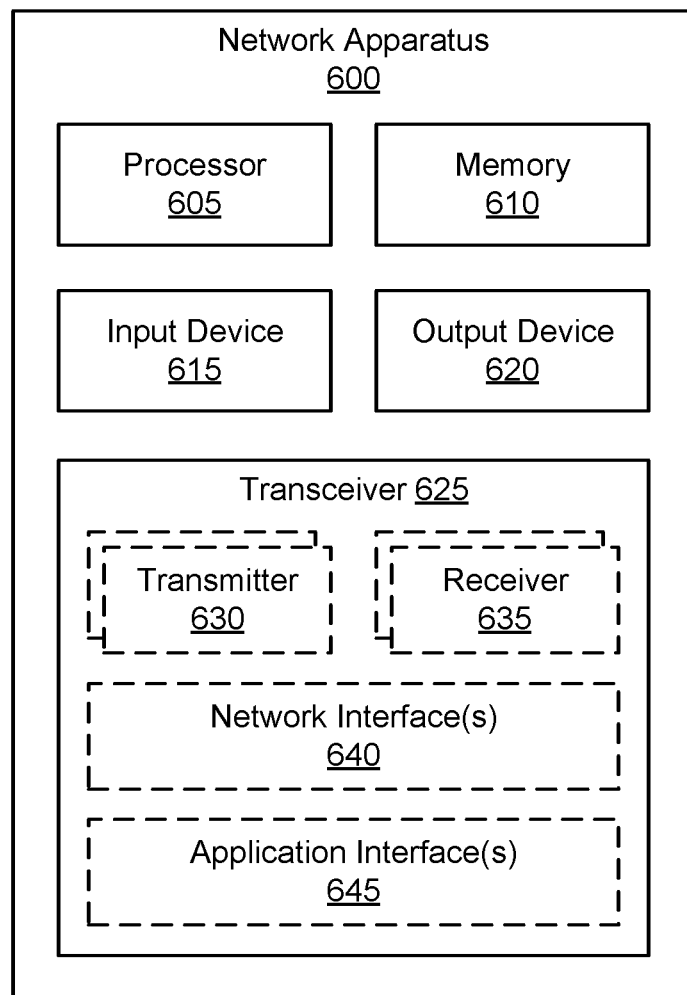
FIG. 6 is a block diagram illustrating one embodiment of a network apparatus that may be used for determining transmitter EVM for an antenna port.

FIG. 6 depicts a network apparatus 600 that may be used for calculating an EVM of a transmitter, according to embodiments of the disclosure. In one embodiment, network apparatus 600 may be one implementation of an evaluation device, such as the test equipment 111, the base unit 121, the evaluator 220, and/or the receiver/evaluator 400, as described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, the processor 605 generates a transmission signal and controls the transmitter 625 to transmit the generated transmission signal to an evaluation device (e.g., test equipment 111) via a propagation channel using an antenna port at the transmitter 630, where the antenna port comprises multiple antennas, with an antenna connector for each antenna.

As described herein, the evaluation device measures the transmitted signal using an unbiased linear MMSE equalizer and calculates an EVM of the antenna port, wherein the EVM is calculated as 100 times the square root of the mean square error of the symbol estimate at the output of the unbiased linear MMSE equalizer.

In various embodiments, the receiver 635 receives a signal via a propagation channel from an antenna port at a transmitter (e.g., UE transmitter or gNB transmitter), the antenna port comprising multiple antennas and with an antenna connector for each antenna. The processor 605 measures the received signal using an unbiased linear MMSE equalizer and calculates an EVM of the antenna port, where the EVM is calculated as 100 times the square root of the mean square error of the symbol estimate at the output of the unbiased linear MMSE equalizer.

In some embodiments, an EVM definition used to calculate the EVM of the antenna port is independent of the propagation channel when a channel matrix H of the propagation channel is invertible. Note that the matrix H is invertible if it has full rank, or equivalently if its determinant is not zero, or equivalently if $H^{-1}$ can be defined such that $H*H^{-1}=I$ (the identity matrix).

In some embodiments, the EVM definition used to calculate the EVM of the antenna port is a function of a precoding matrix used to generate the received signal. In some embodiments, the transmitted signal is received at the unbiased linear MMSE equalizer using a same number of antennas as comprises the transmitter antenna port.

In some embodiments, the EVM of a transmitted signal is calculated as:

$$EVM=100\cdot\sqrt{(w^H\Sigma^{-1}w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2(EVM_2)^2}{(EVM_1)^2 + (EVM_2)^2}},$$

where $EVM_1$ is the EVM measured at the first antenna connector and where $EVM_2$ is the EVM measured at the second antenna connector.

In some embodiments, the mean error of the unbiased linear MMSE equalizer is zero. In some embodiments, the transmitter comprises a User Equipment transmitter for transmitting uplink signals to a base station. In certain embodiments, the processor 605 further defines a noise floor of the base station due to transmitter noise using the calculated EVM.

In various embodiments, the processor 605 generates a single-layer MIMO signal and controls the transmitter 630 to transmit the generated single-layer MIMO signal to an evaluation device (e.g., test equipment 111) via a propagation channel. As described herein, the evaluation device measures the single-layer MIMO signal using an unbiased linear MMSE equalizer and calculates an EVM of the transmitter 630, wherein the EVM for the single-layer MIMO signal is calculated as 100 times the square root of the mean square error of the symbol estimate at the output of the unbiased linear MMSE equalizer.

In various embodiments, the receiver 635 receives the single-layer MIMO signal from a transmitter (e.g., UE transmitter or gNB transmitter) via a propagation channel. The processor 605 measures the received single-layer MIMO signal using an unbiased linear MMSE equalizer and calculates an EVM of the transmitter, where the EVM for the received single-layer MIMO signal is calculated as 100 times the square root of the mean square error of the symbol estimate at the output of the unbiased linear MMSE equalizer.

In some embodiments, an EVM definition used to calculate the EVM of the transmitter is independent of the propagation channel when a channel matrix H of the propagation channel is invertible. Note that the matrix H is invertible if it has full rank, or equivalently if its determinant is not zero, or equivalently if $H^{-1}$ can be defined such that $H*H^{-1}=I$ (the identity matrix).

In some embodiments, the EVM definition used to calculate the EVM of the transmitter is a function of a precoding matrix used to generate the single-layer MIMO signal. In some embodiments, the transmitter transmits the generated single-layer MIMO signal using a plurality of antennas and wherein the single-layer MIMO signal is received at the unbiased linear MMSE equalizer using a same number of antennas.

In some embodiments, the EVM of the received single-layer MIMO signal is calculated as:

$$EVM = 100 \cdot \sqrt{(w^H \Sigma^{-1} w)^{-1}},$$

In certain embodiments, noise between the antenna connectors is uncorrelated. In such embodiments, the EVM of the transmitted single-layer MIMO signal may be calculated as:

$$EVM = \sqrt{\frac{(EVM_1)^2 (EVM_2)^2}{(EVM_1)^2 + (EVM_2)^2}},$$

where $EVM_1$ is the EVM measured at the first antenna connector and where $EVM_2$ is the EVM measured at the second antenna connector.

In some embodiments, the mean error of the unbiased linear MMSE MIMO equalizer is zero. In some embodiments, the transmitter comprises a User Equipment transmitter for transmitting uplink signals to a base station. In certain embodiments, the processor 605 further defines a noise floor of the base station due to transmitter noise using the calculated EVM.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to calculating an EVM of a transmitter. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
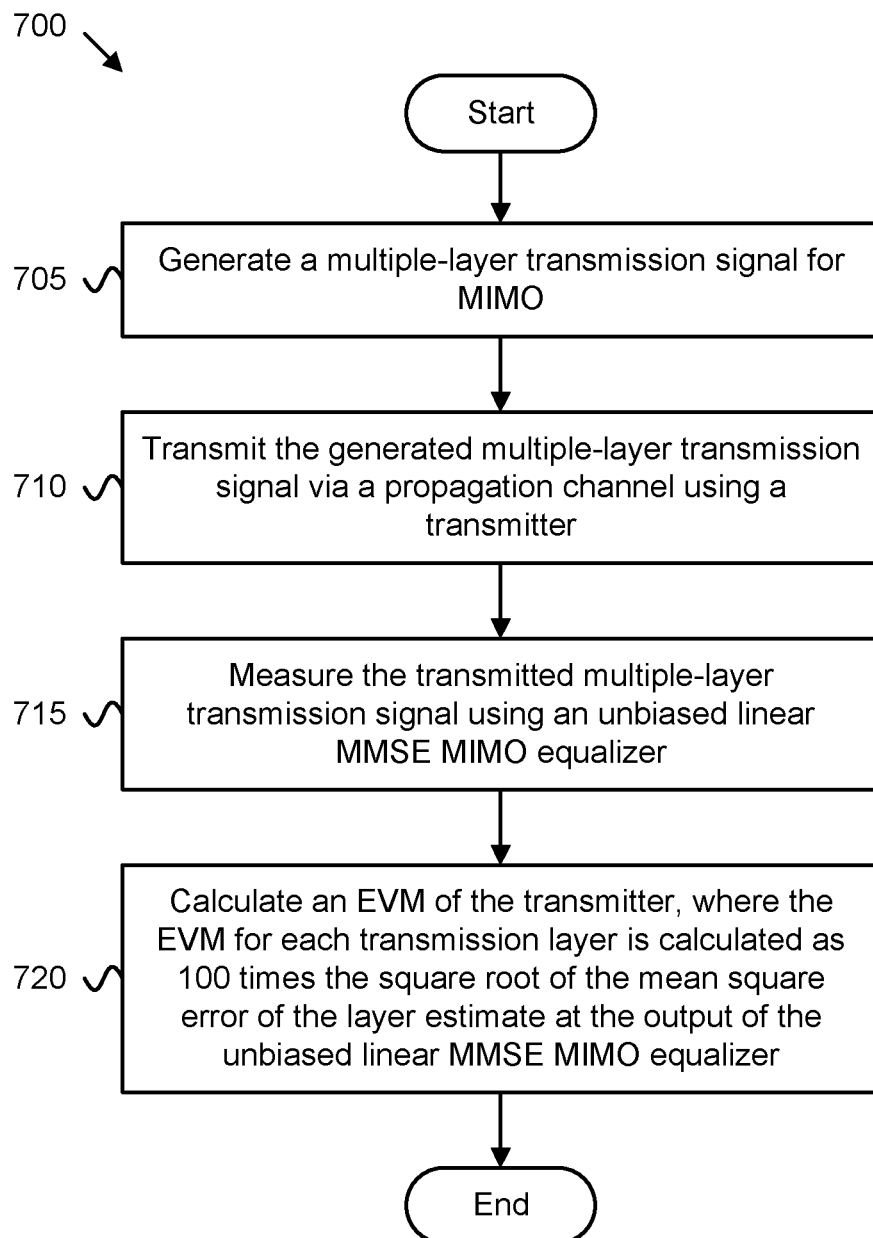
FIG. 7 is a block diagram illustrating one embodiment of a first method for determining transmitter EVM for an antenna port.

FIG. 7 depicts one embodiment of a method 700 for calculating an EVM of a transmitter, according to embodiments of the disclosure. In various embodiments, the method 700 is performed by a transmitting device (such as the remote unit 105, the transmitter 205, and/or the user equipment apparatus 500) and an evaluation device (such as the test equipment 111, the base unit 121, the evaluator 220, the receiver/evaluator 400, and/or the network apparatus 600), as described above. In some embodiments, the method 700 is performed by a processor, such as a microcontroller, a microprocessor, a CPU, a GPU, an auxiliary processing unit, a FPGA, or the like.

The method 700 begins and generates 705 (i.e., by the transmitting device) a transmission signal. The method 700 includes transmitting 710 the generated transmission signal via a propagation channel using an antenna port at a transmitter, where the antenna port comprises multiple antennas and with an antenna connector for each antenna. The method 700 includes measuring 715 (i.e., by the evaluation device) the transmitted signal using an unbiased linear MMSE equalizer. The method 700 includes calculating 720 an EVM of the antenna port, where the EVM is calculated as 100 times the square root of the mean square error of the symbol estimate at the output of the unbiased linear MMSE equalizer. The method 700 ends.

Figure 8:
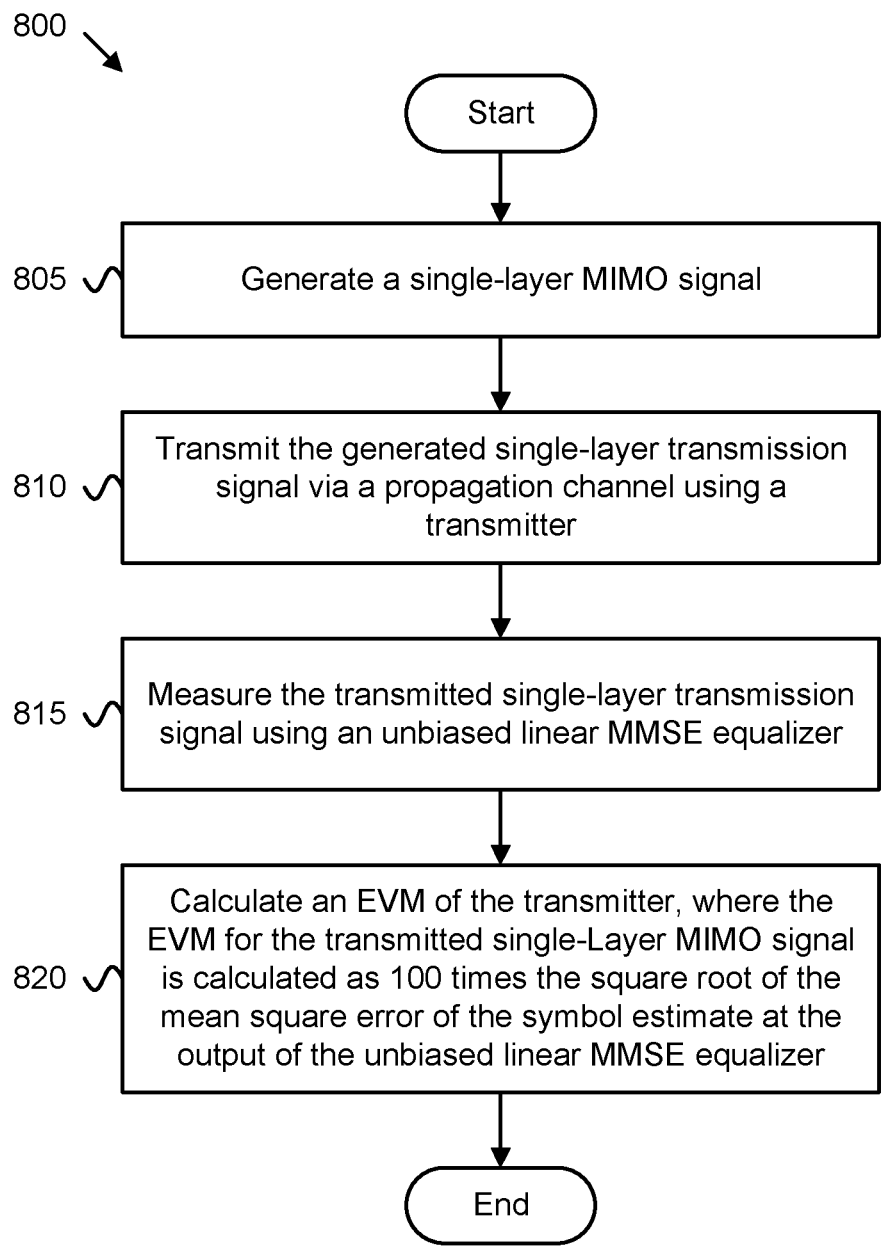
FIG. 8 is a block diagram illustrating one embodiment of a second method for determining transmitter EVM for an antenna port.

FIG. 8 depicts one embodiment of a method 800 for calculating an EVM of a transmitter, according to embodiments of the disclosure. In various embodiments, the method 800 is performed by a transmitting device (such as the remote unit 105, the transmitter 205, and/or the user equipment apparatus 500) and an evaluation device (such as the test equipment 111, the base unit 121, the evaluator 220, the receiver/evaluator 400, and/or the network apparatus 600), as described above. In some embodiments, the method 800 is performed by a processor, such as a microcontroller, a microprocessor, a CPU, a GPU, an auxiliary processing unit, a FPGA, or the like.

The method 800 begins and generates 805 (i.e., by the transmitting device) a single-layer MIMO signal. The method 800 includes transmitting 810 the single-layer MIMO signal via a propagation channel using a transmitter. The method 800 includes measuring 815 the transmitted single-layer MIMO signal using an unbiased linear MMSE equalizer. The method 800 includes calculating 820 an EVM of the transmitter, where the EVM for the transmitted single-layer MIMO signal is calculated as 100 times the square root of the mean square error of the symbol estimate at the output of the unbiased linear MMSE equalizer. The method 800 ends.

Figure 9:
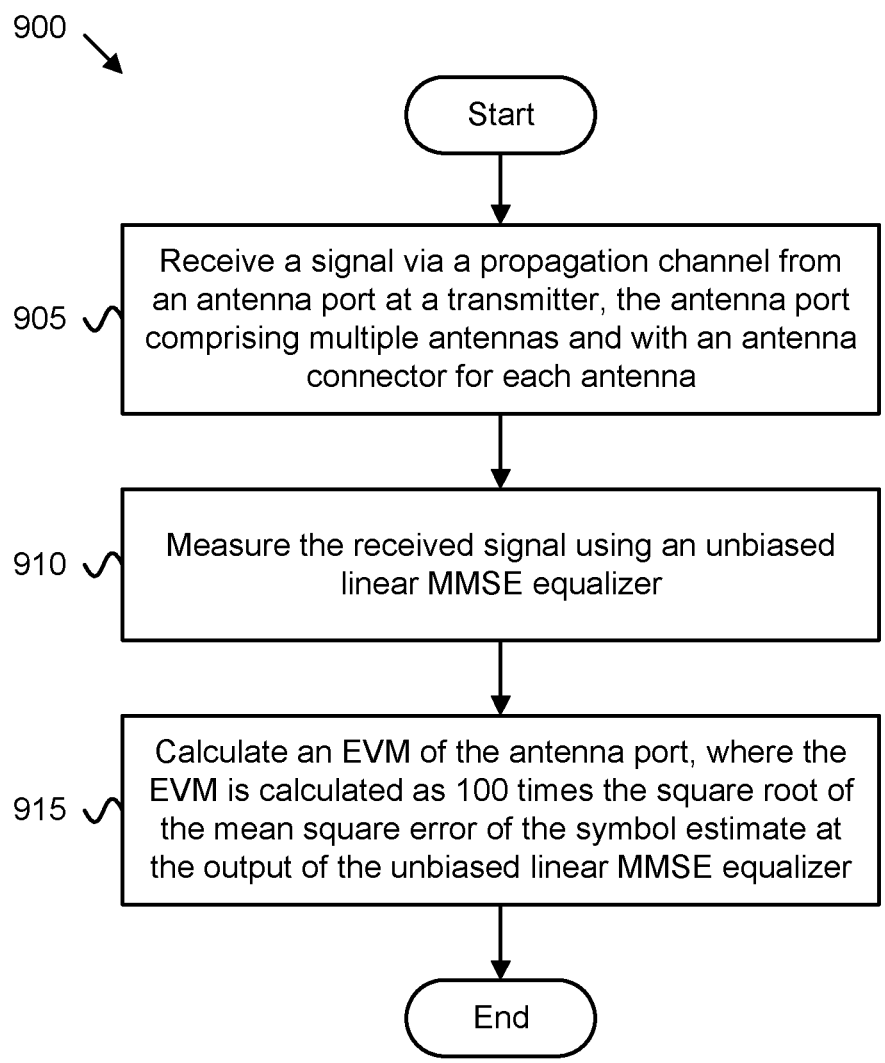
FIG. 9 is a block diagram illustrating one embodiment of a third method for determining transmitter EVM for an antenna port.

FIG. 9 depicts one embodiment of a method 900 for calculating an EVM of a transmitter, according to embodiments of the disclosure. In various embodiments, the method 900 is performed by an evaluation device, such as the test equipment 111, the base unit 121, the receiver/evaluator 400, and/or the network apparatus 600, as described above. In some embodiments, the method 900 is performed by a processor, such as a microcontroller, a microprocessor, a CPU, a GPU, an auxiliary processing unit, a FPGA, or the like.

The method 900 begins and receives 905 a signal via a propagation channel from an antenna port at a transmitter, the antenna port comprising multiple antennas and with an antenna connector for each antenna. The method 900 includes measuring 910 the received signal using an unbiased linear MMSE equalizer. The method 900 includes calculating 915 an EVM of the antenna port, where the EVM is calculated as 100 times the square root of the mean square error of the symbol estimate at the output of the linear unbiased MMSE equalizer. The method 900 ends.

Figure 10:
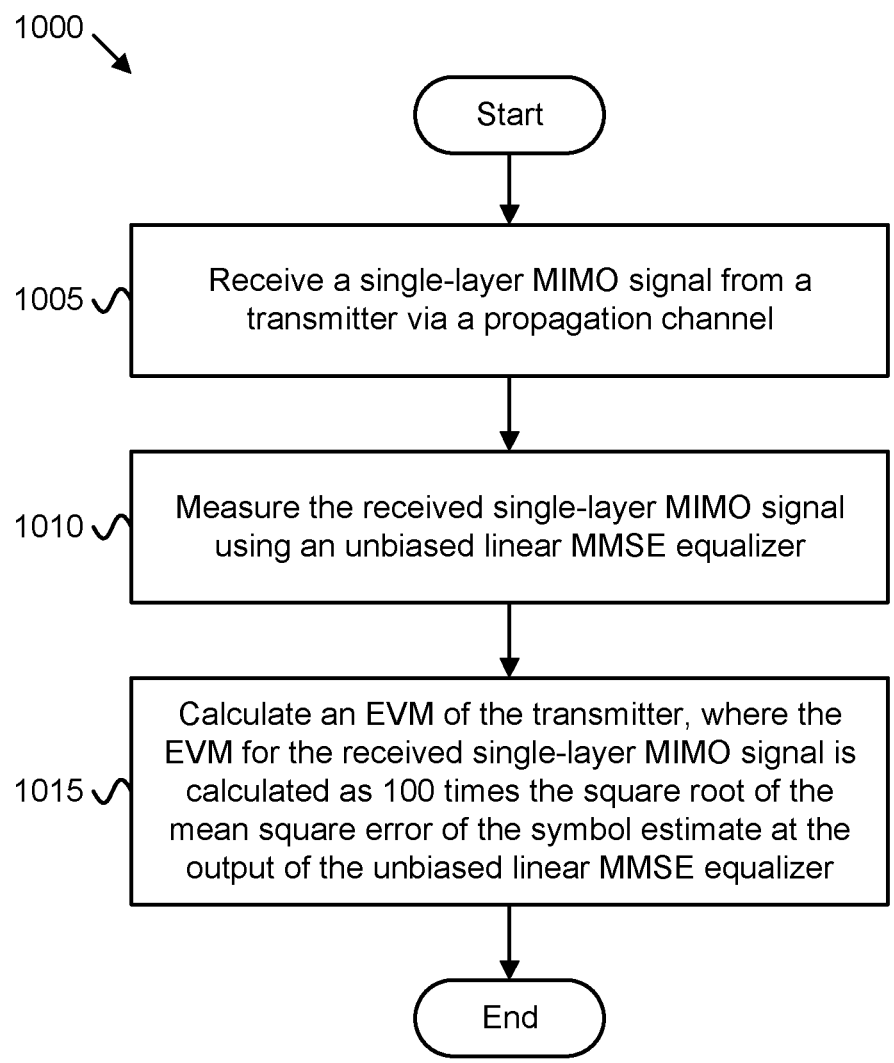
FIG. 10 is a block diagram illustrating one embodiment of a fourth method for determining transmitter EVM for an antenna port.

FIG. 10 depicts one embodiment of a method 1000 for calculating an EVM of a transmitter, according to embodiments of the disclosure. In various embodiments, the method 1000 is performed by an evaluation device, such as the test equipment 111, the base unit 121, the receiver/evaluator 400, and/or the network apparatus 600, as described above. In some embodiments, the method 1000 is performed by a processor, such as a microcontroller, a microprocessor, a CPU, a GPU, an auxiliary processing unit, a FPGA, or the like.

The method 1000 begins and receives 1005 a single-layer MIMO signal from a transmitter via a propagation channel. The method 1000 includes measuring 1010 the received single-layer MIMO signal using an unbiased linear MMSE equalizer. The method 1000 includes calculating 1015 an EVM of the transmitter, where the EVM for the received single-layer MIMO signal is calculated as 100 times the square root of the mean square error of the symbol estimate at the output of the linear unbiased MMSE equalizer. The method 1000 ends.

Disclosed herein is a first system for calculating an EVM of a transmitter, according to embodiments of the disclosure. The first system may be implemented by a transmitting device (such as the remote unit 105, the transmitter 205, and/or the user equipment apparatus 500) and an evaluating device (such as the test equipment 111, the base unit 121, the receiver/evaluator 400, and/or the network apparatus 600), described above. The transmitting device generates a transmission signal and transmits the generated transmission signal via a propagation channel using an antenna port at a transmitter, the antenna port comprising multiple antennas and with an antenna connector for each antenna. The evaluation device receives the transmitted signal using an unbiased linear MMSE equalizer and calculates an EVM of the antenna port, where the EVM is calculated as 100 times the square root of the mean square error of the symbol estimate at the output of the unbiased linear MMSE equalizer.

In some embodiments, an EVM definition used to calculate the EVM of the antenna port is independent of the propagation channel when a channel matrix H of the propagation channel is invertible. In some embodiments, the EVM definition used to calculate the EVM of the antenna port is a function of a precoding matrix used to generate the transmission signal. In some embodiments, the transmitted signal is received at the unbiased linear MMSE equalizer using a same number of antenna as comprises the transmitter antenna port.

In some embodiments, the EVM of a transmitted signal is calculated as $$EVM = 100 \cdot \sqrt{(w^H \Sigma^{-1} w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2 (EVM_2)^2}{(EVM_1)^2 + (EVM_2)^2}},$$

where $EVM_1$ is the EVM measured at the first antenna connector and where $EVM_2$ is the EVM measured at the second antenna connector.

In some embodiments, the mean error of the unbiased linear MMSE MIMO equalizer is zero. In some embodiments, the transmitter comprises a User Equipment transmitter for transmitting uplink signals to a base station. In certain embodiments, the evaluation device further defines a noise floor of the base station due to transmitter noise using the calculated EVM.

Disclosed herein is a second system for calculating an EVM of a transmitter, according to embodiments of the disclosure. The second system may be implemented by a transmitting device (such as the remote unit 105, the transmitter 205, and/or the user equipment apparatus 500) and an evaluating device (such as the test equipment 111, the base unit 121, the receiver/evaluator 400, and/or the network apparatus 600), described above. The transmitting device generates a single-layer MIMO signal and transmits the single-layer MIMO signal via a propagation channel using a transmitter. The evaluation device receives the transmitted single-layer MIMO signal using an unbiased linear MMSE equalizer and calculates an EVM of the transmitter, where the EVM for the transmitted single-layer MIMO signal is calculated as 100 times the square root of the mean square error of the symbol estimate at the output of the unbiased linear MMSE equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the single-layer MIMO signal. In some embodiments, the transmitter transmits the generated single-layer MIMO signal using a plurality of antennas and where the transmitted signal is received at the unbiased linear MMSE equalizer using a same number of antennas.

In some embodiments, the EVM of a transmitted single-layer MIMO signal is calculated as $$EVM=100\cdot\sqrt{(w^H \Sigma^{-1} w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2 (EVM_2)^2}{(EVM_1)^2 + (EVM_2)^2}},$$

where $EVM_1$ is the EVM measured at the first antenna connector and where $EVM_2$ is the EVM measured at the second antenna connector.

In some embodiments, the mean error of the unbiased linear MMSE MIMO equalizer is zero. In some embodiments, the transmitter comprises a User Equipment transmitter for transmitting uplink signals to a base station. In some embodiments, the evaluation device further defines a noise floor of the base station due to transmitter noise using the calculated EVM.

Disclosed herein is a first method for calculating an EVM of a transmitter, according to embodiments of the disclosure. The first method may be performed by a system comprising a transmitter (for example remote unit 105, a transmitter 205, and/or the user equipment apparatus 500) and a receiver (for example a base unit 121, a test equipment 111, a receiver/evaluator 400, and/or network apparatus 600), described above.

The first method includes generating a transmission signal and transmitting the generated transmission signal via a propagation channel using an antenna port at a transmitter, where the antenna port comprises multiple antennas and with an antenna connector for each antenna. The first method includes receiving the transmitted signal using an unbiased linear MMSE equalizer and calculating an EVM of the antenna port, where the EVM is calculated as 100 times the square root of the mean square error of the symbol estimate at the output of the unbiased linear MMSE equalizer.

In some embodiments, an EVM definition used to calculate the EVM of the antenna port is independent of the propagation channel when a channel matrix H of the propagation channel is invertible. In some embodiments, the EVM definition used to calculate the EVM of the antenna port is a function of a precoding matrix used to generate the transmission signal. In some embodiments, the transmitted signal is received at the unbiased linear MMSE equalizer using a same number of antennas as comprises the transmitter antenna port.

In some embodiments, the EVM of a transmitted signal is calculated as $$EVM=100\cdot\sqrt{(w^H \Sigma^{-1} w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2 (EVM_2)^2}{(EVM_1)^2 + (EVM_2)^2}},$$

where $EVM_1$ is the EVM measured at the first antenna connector and where $EVM_2$ is the EVM measured at the second antenna connector.

In some embodiments, the mean error of the unbiased linear MMSE equalizer is zero. In some embodiments, the transmitter comprises a User Equipment transmitter for transmitting uplink signals to a base station. In certain embodiments, the first method includes defining a noise floor of the base station due to transmitter noise using the calculated EVM.

Disclosed herein is a second method for calculating an EVM of a transmitter, according to embodiments of the disclosure. The second method may be performed by a system comprising a transmitter (for example remote unit 105, a transmitter 205, and/or the user equipment apparatus 500) and a receiver (for example a base unit 121, a test equipment 111, a receiver/evaluator 400, and/or network apparatus 600), described above.

The second method includes generating a single-layer MIMO signal and transmitting the single-layer MIMO signal via a propagation channel using a transmitter. The second method includes receiving the transmitted single-layer MIMO signal using an unbiased linear MMSE equalizer and calculating an EVM of the transmitter, where the EVM for the transmitted single-layer MIMO signal is calculated as 100 times the square root of the mean square error of the symbol estimate at the output of the unbiased linear MMSE equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the single-layer MIMO signal. In some embodiments, the transmitter transmits the generated single-layer MIMO signal using a plurality of antennas and where the transmitted signal is received at the unbiased linear MMSE equalizer using a same number of antennas.

In some embodiments, the EVM of a transmitted single-layer MIMO signal is calculated as:

$$EVM = 100 \cdot \sqrt{(w^H \Sigma^{-1} w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2 (EVM_2)^2}{(EVM_1)^2 + (EVM_2)^2}},$$

where $EVM_1$ is the EVM measured at the first antenna connector and where $EVM_2$ is the EVM measured at the second antenna connector.

In some embodiments, the mean error of the unbiased linear MMSE MIMO equalizer is zero. In some embodiments, the transmitter comprises a User Equipment transmitter for transmitting uplink signals to a base station. In certain embodiments, the method includes defining a noise floor of the base station due to transmitter noise using the calculated EVM.

Disclosed herein is a first apparatus for calculating an EVM of a transmitter, according to embodiments of the disclosure. The first apparatus may be implemented by a transmitting device in a mobile communication network, such as the remote unit 105, the transmitter 205, and/or the user equipment apparatus 600, described above. The first apparatus includes a processor that generates a transmission signal and a transceiver that transmits the generated transmission signal to an evaluation device via a propagation channel using an antenna port at a transmitter, the antenna port comprising multiple antennas and with an antenna connector for each antenna. Here, the evaluation device measures the transmitted signal using an unbiased linear MMSE equalizer and calculates an EVM of the antenna port, where the EVM is calculated as 100 times the square root of the mean square error of the symbol estimate at the output of the unbiased linear MMSE equalizer.

Disclosed herein is a second apparatus for calculating an EVM of a transmitter, according to embodiments of the disclosure. The second apparatus may be implemented by a transmitting device in a mobile communication network, such as the remote unit 105, the transmitter 205, and/or the user equipment apparatus 600, described above. The second apparatus includes a processor that generates a single-layer MIMO signal and a transceiver that transmits the generated single-layer MIMO signal to an evaluation device via a propagation channel using a transmitter. Here, the evaluation device measures the transmitted signal using an unbiased linear MMSE equalizer and calculates an EVM of the transmitter, where the EVM for the transmitted single-layer MIMO signal is calculated as 100 times the square root of the mean square error of the symbol estimate at the output of the unbiased linear MMSE equalizer.

Disclosed herein is a third apparatus for calculating an EVM of a transmitter, according to embodiments of the disclosure. The third apparatus may be implemented by an evaluation device, such as the test equipment 111, the base unit 121, the receiver/evaluator 400, and/or the network apparatus 600, described above.

The third apparatus includes a processor and a receiver that receives a signal via a propagation channel from an antenna port at a transmitter, the antenna port comprising multiple antennas and with an antenna connector for each antenna. The processor measures the received signal using an unbiased linear MMSE equalizer and calculates an EVM of the antenna port, where the EVM is calculated as 100 times the square root of the mean square error of the symbol estimate at the output of the unbiased linear MMSE equalizer.

In some embodiments, an EVM definition used to calculate the EVM of the antenna port is independent of the propagation channel when a channel matrix H of the propagation channel is invertible. In some embodiments, the EVM definition used to calculate the EVM of the antenna port is a function of a precoding matrix used to generate the received signal. In some embodiments, the transmitted signal is received at the unbiased linear MMSE equalizer using a same number of antennas as comprises the transmitter antenna port.

In some embodiments, the EVM of a transmitted signal is calculated as:

$$EVM = 100 \cdot \sqrt{(w^H \Sigma^{-1} w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2 (EVM_2)^2}{(EVM_1)^2 + (EVM_2)^2}},$$

where $EVM_1$ is the EVM measured at the first antenna connector and where $EVM_2$ is the EVM measured at the second antenna connector.

In some embodiments, the mean error of the unbiased linear MMSE equalizer is zero. In some embodiments, the transmitter comprises a User Equipment transmitter for transmitting uplink signals to a base station. In certain embodiments, the processor further defines a noise floor of the base station due to transmitter noise using the calculated EVM.

Disclosed herein is a fourth apparatus for calculating an EVM of a transmitter, according to embodiments of the disclosure. The fourth apparatus may be implemented by an evaluation device, such as the test equipment 111, the base unit 121, the receiver/evaluator 400, and/or the network apparatus 600, described above.

The fourth apparatus includes a processor and a receiver that receives the single-layer MIMO signal from a transmitter via a propagation channel. The processor measures the received single-layer MIMO signal using an unbiased linear MMSE equalizer and calculates an EVM of the transmitter, where the EVM for the received single-layer MIMO signal is calculated as 100 times the square root of the mean square error of the symbol estimate at the output of the unbiased linear MMSE equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the single-layer MIMO signal. In some embodiments, the transmitter transmits the generated single-layer MIMO signal using a plurality of antennas and the single-layer MIMO signal is received at the unbiased linear MMSE equalizer using a same number of antennas.

In some embodiments, the EVM of a transmitted single-layer MIMO signal is calculated as:

$$EVM = 100 \cdot \sqrt{(w^H \Sigma^{-1} w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2 (EVM_2)^2}{(EVM_1)^2 + (EVM_2)^2}},$$

$EVM_1$ is the EVM measured at the first antenna connector and where $EVM_2$ is the EVM measured at the second antenna connector.

In some embodiments, the mean error of the unbiased linear MMSE MIMO equalizer is zero. In some embodiments, the transmitter comprises a User Equipment transmitter for transmitting uplink signals to a base station. In certain embodiments, the processor further defines a noise floor of the base station due to transmitter noise using the calculated EVM.

Disclosed herein is a third method for calculating an EVM of a transmitter, according to embodiments of the disclosure. The third method may be performed by an evaluation device, such as the test equipment 111, the base unit 121, the receiver/evaluator 400, and/or the network apparatus 600, described above.

The third method includes receiving a signal via a propagation channel from an antenna port at a transmitter, where the antenna port comprises multiple antennas and with an antenna connector for each antenna. The third method includes measuring the received signal using an unbiased linear MMSE equalizer and calculating an EVM of the antenna port, where the EVM is calculated as 100 times the square root of the mean square error of the symbol estimate at the output of the unbiased linear MMSE equalizer.

In some embodiments, an EVM definition used to calculate the EVM of the antenna port is independent of the propagation channel when a channel matrix H of the propagation channel is invertible. In some embodiments, the EVM definition used to calculate the EVM of the antenna port is a function of a precoding matrix used to generate the received signal. In some embodiments, the transmitted signal is received at the unbiased linear MMSE equalizer using a same number of antennas as comprises the transmitter antenna port.

In some embodiments, the EVM of a transmitted signal is calculated as:

$$EVM = 100 \cdot \sqrt{(w^H \Sigma^{-1} w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2 (EVM_2)^2}{(EVM_1)^2 + (EVM_2)^2}},$$

$EVM_1$ is the EVM measured at the first antenna connector and where $EVM_2$ is the EVM measured at the second antenna connector.

In some embodiments, the mean error of the unbiased linear MMSE equalizer is zero. In some embodiments, the transmitter comprises a User Equipment transmitter for transmitting uplink signals to a base station. In certain embodiments, the third method includes defining a noise floor of the base station due to transmitter noise using the calculated EVM.

Disclosed herein is a fourth method for calculating an EVM of a transmitter, according to embodiments of the disclosure. The fourth method may be performed by an evaluation device, such as the test equipment 111, the base unit 121, the receiver/evaluator 400, and/or the network apparatus 600, described above.

The fourth method includes receiving the single-layer MIMO signal from a transmitter via a propagation channel and measuring the received single-layer MIMO signal using an unbiased linear MMSE equalizer. The fourth method includes calculating an EVM of the transmitter, wherein the EVM for the received single-layer MIMO signal is calculated as 100 times the square root of the mean square error of the symbol estimate at the output of the unbiased linear MMSE equalizer.

In some embodiments, an EVM definition used to calculate the EVM of the transmitter is independent of the propagation channel when a channel matrix H of the propagation channel is invertible. In some embodiments, the EVM definition used to calculate the EVM of the transmitter is a function of a precoding matrix used to generate the single-layer MIMO signal. In some embodiments, the transmitter transmits the generated single-layer MIMO signal using a plurality of antennas and wherein the single-layer MIMO signal is received at the unbiased linear MMSE equalizer using a same number of antennas.

In some embodiments, the EVM of a transmitted single-layer MIMO signal is calculated as:

$$EVM = 100 \cdot \sqrt{(w^H \Sigma^{-1} w)^{-1}},$$

where w denotes the vector of gains measured at the antenna connectors and $\Sigma$ denotes the noise covariance vector as measured at the antenna connectors.

In certain embodiments, noise between the antenna connectors is uncorrelated. In such embodiments, the EVM of the transmitted single-layer MIMO signal may be calculated as:

$$EVM = \sqrt{\frac{(EVM_1)^2(EVM_2)^2}{(EVM_1)^2 + (EVM_2)^2}},$$

where $EVM_1$ is the EVM measured at the first antenna connector and where $EVM_2$ is the EVM measured at the second antenna connector.

In some embodiments, the mean error of the unbiased linear MMSE MIMO equalizer is zero. In some embodiments, the transmitter comprises a User Equipment transmitter for transmitting uplink signals to a base station, the method further comprising defining a noise floor of the base station due to transmitter noise using the calculated EVM.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An evaluation apparatus comprising:
   at least one memory; and
   at least one processor coupled with the at least one memory and configured to cause the evaluation apparatus to:
      receive a signal via a propagation channel from an antenna port at a transmitter, the antenna port comprising a plurality of antennas, wherein each antenna of the plurality of antennas has a respective antenna connector from a plurality of antenna connectors;
      measure the received signal using an unbiased linear minimum mean square error ("MMSE") equalizer; and
      calculate an error vector magnitude ("EVM") of the antenna port based at least in part on the received signal and an output of the unbiased linear MMSE equalizer, wherein the EVM is calculated as $$EVM = 100 \cdot \sqrt{(w^H \Sigma^{-1} w)^{-1}},$$

where w denotes a vector of gains measured at a plurality of antenna connectors and $\Sigma$ denotes a noise covariance vector as measured at the plurality of antenna connectors.

2. The evaluation apparatus of claim 1, wherein an EVM definition used to calculate the EVM of the antenna port is independent of the propagation channel when a channel matrix H of the propagation channel is invertible.

3. The evaluation apparatus of claim 2, wherein the EVM definition used to calculate the EVM of the antenna port is a function of a precoding matrix associated with the received signal.

4. The evaluation apparatus of claim 1, wherein the received signal is received using a same number of antennas as comprises the antenna port at the transmitter.

5. The evaluation apparatus of claim 1, wherein the EVM of the antenna port is calculated as $$EVM = \sqrt{\frac{(EVM_1)^2(EVM_2)^2}{(EVM_1)^2 + (EVM_2)^2}},$$

if the noise between antenna connectors is uncorrelated, where $EVM_1$ is a respective EVM measured at a first antenna connector and where $EVM_2$ is a respective EVM measured at a second antenna connector.

6. The evaluation apparatus of claim 1, wherein the transmitter comprises a user equipment ("UE") for transmitting uplink signals to a base station, wherein the at least one processor is configured to cause the evaluation apparatus to define a noise floor of the base station due to transmitter noise using the calculated EVM.

7. A method performed by an evaluation device, the method comprising:
   receiving a signal via a propagation channel from an antenna port at a transmitter, the antenna port comprising a plurality of antennas, wherein each antenna of the plurality of antennas has a respective antenna connector from a plurality of antenna connectors;
   measuring the received signal using an unbiased linear minimum mean square error ("MMSE") equalizer; and
   calculating an error vector magnitude ("EVM") of the antenna port based at least in part on the received signal and an output of the unbiased linear MMSE equalizer, wherein the EVM is calculated as $$EVM = 100 \cdot \sqrt{(w^H \Sigma^{-1} w)^{-1}},$$

where w denotes a vector of gains measured at a plurality of antenna connectors and $\Sigma$ denotes a noise covariance vector as measured at the plurality of antenna connectors.

8. The method of claim 7, wherein an EVM definition used to calculate the EVM of the antenna port is independent of the propagation channel when a channel matrix H of the propagation channel is invertible.

9. The method of claim 8, wherein the EVM definition used to calculate the EVM of the antenna port is a function of a precoding matrix associated with the received signal.

10. The method of claim 7, wherein the received signal is received at the unbiased linear MMSE equalizer using a same number of antennas as comprises the antenna port at the transmitter.

11. The method of claim 7, wherein the EVM of the antenna port is calculated as $$EVM = \sqrt{\frac{(EVM_1)^2(EVM_2)^2}{(EVM_1)^2 + (EVM_2)^2}},$$

if the noise between antenna connectors is uncorrelated, where $EVM_1$ is a respective EVM measured at a first antenna connector and where $EVM_2$ is a respective EVM measured at a second antenna connector.

12. The method of claim 7, wherein the transmitter comprises a user equipment ("UE") for transmitting uplink signals to a base station, the method further comprising defining a noise floor of the base station due to transmitter noise using the calculated EVM.

13. A system comprising:
   a transmitting device that:
      generates a single-layer Multiple-Input, Multiple-Output ("MIMO") signal; and transmits the single-layer MIMO signal via a propagation channel using a transmitter;
an evaluation device that:
receives the single-layer MIMO signal using an unbiased linear minimum mean square error ("MMSE") equalizer; and
calculates an error vector magnitude ("EVM") of the transmitter based at least in part on the single-layer MIMO signal and an output of the unbiased linear MMSE equalizer, wherein the EVM is calculated as $$EVM = 100 \cdot \sqrt{(w^H \Sigma^{-1} w)^{-1}},$$

where w denotes a vector of gains measured at a plurality of antenna connectors and $\Sigma$ denotes a noise covariance vector as measured at the plurality of antenna connectors.

14. The system of claim 13, wherein an EVM definition used to calculate the EVM is independent of the propagation channel when a channel matrix H of the propagation channel is invertible.

15. The system of claim 14, wherein the EVM definition used to calculate the EVM of the transmitter is a function of a precoding matrix used to generate the single-layer MIMO signal.

16. The system of claim 13, wherein the single-layer MIMO signal is received at the unbiased linear MMSE equalizer using a same number of antennas as comprises an antenna port of the transmitter.

17. The system of claim 13, wherein the EVM is calculated as $$EVM = \sqrt{\frac{(EVM_1)^2 (EVM_2)^2}{(EVM_1)^2 + (EVM_2)^2}},$$

if the noise between a plurality of antenna connectors is uncorrelated, where $EVM_1$ is a first respective EVM measured at a first antenna connector and where $EVM_2$ is a second respective EVM measured at a second antenna connector.

* * * * *